June 18, 1968 R. W. HILTON 3,388,580
METHOD AND APPARATUS FOR FABRICATING CELLULAR LOAD
BEARING PLANKS INVOLVING IMPACT EXTRUSION OF
CYLINDRICAL CELLULAR SLABS
Filed Oct. 18, 1965 2 Sheets-Sheet 1
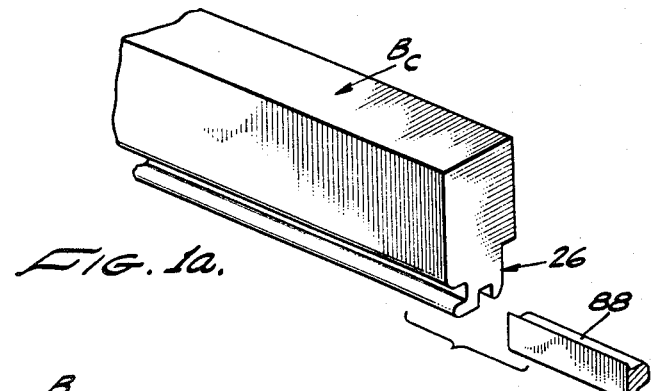
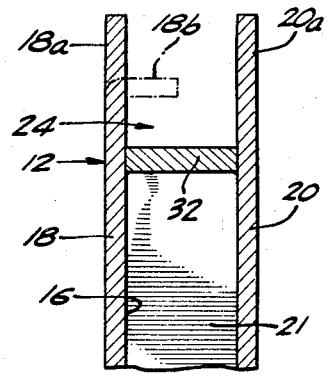
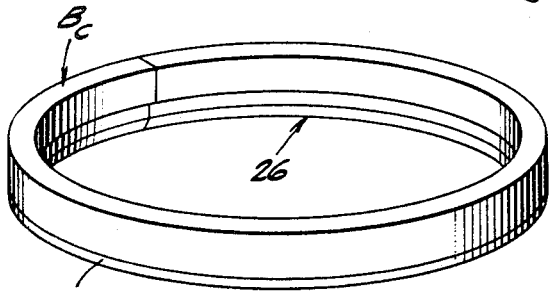
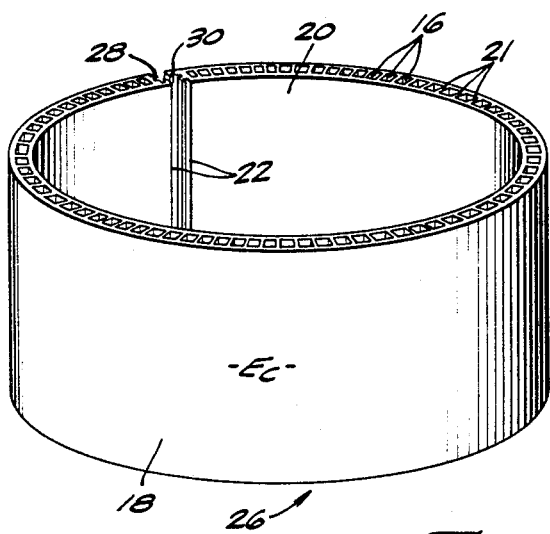
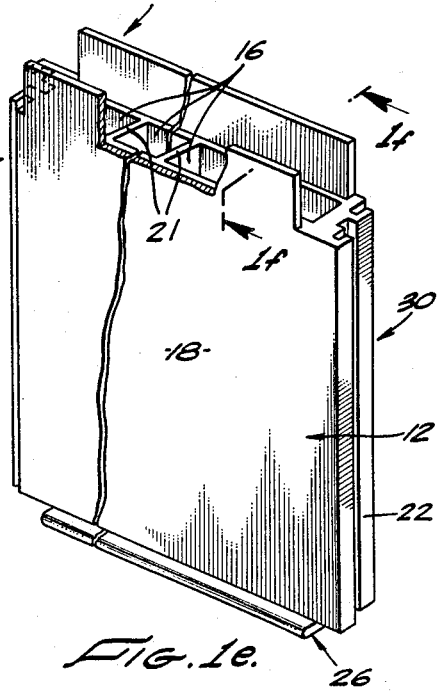
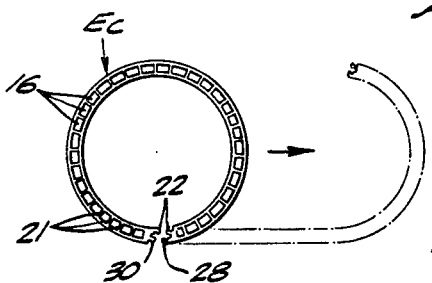
INVENTOR.
RALPH W. HILTON
BY
ATTORNEY

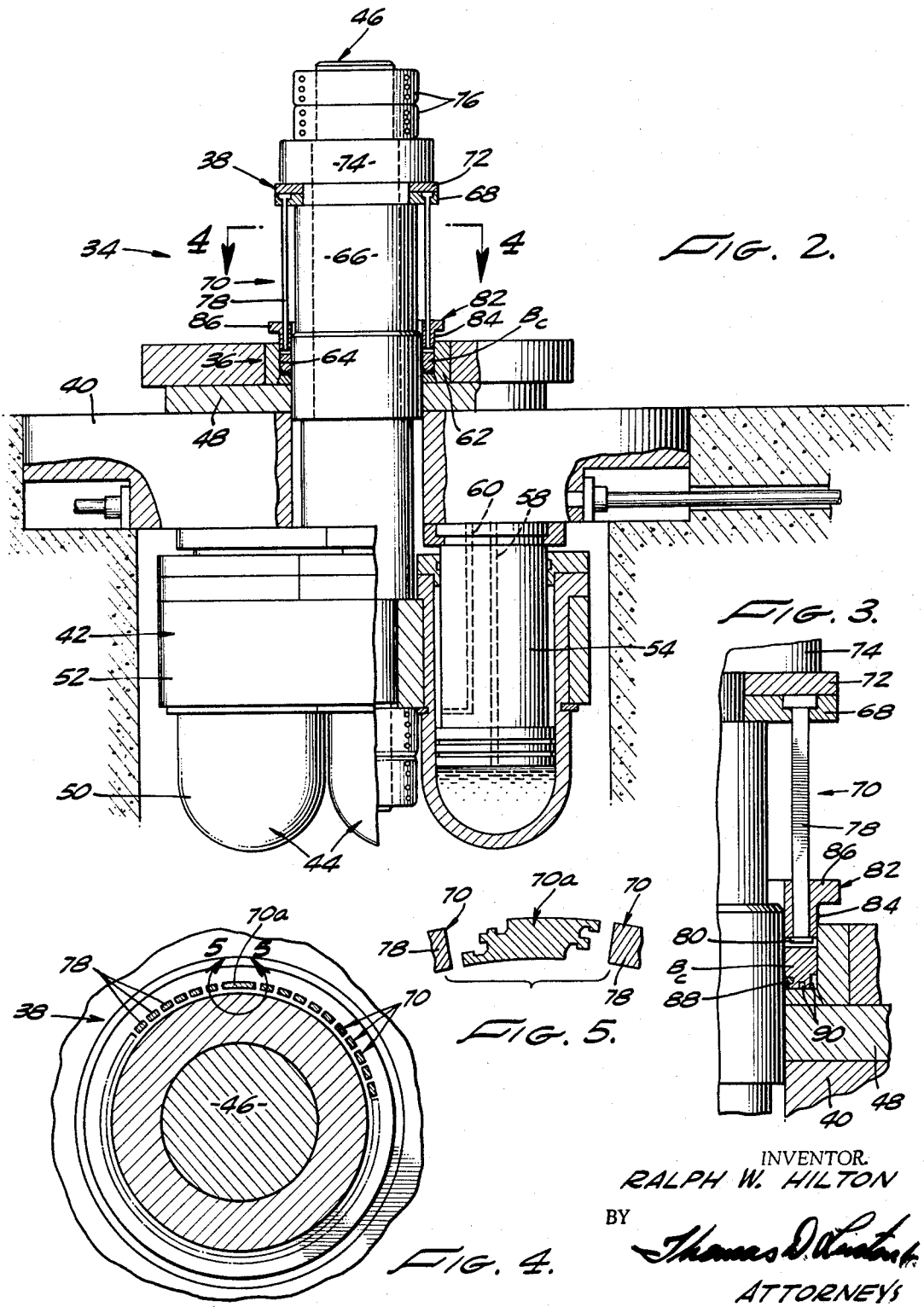

United States Patent Office 3,388,580
Patented June 18, 1968

3,388,580
METHOD AND APPARATUS FOR FABRICATING CELLULAR LOAD BEARING PLANKS INVOLVING IMPACT EXTRUSION OF CYLINDRICAL CELLULAR SLABS
Ralph W. Hilton, Torrance, Calif., assignor to Harvey Aluminum (Incorporated), Torrance, Calif., a corporation of California
Filed Oct. 18, 1965, Ser. No. 496,934
7 Claims. (Cl. 72—266)

ABSTRACT OF THE DISCLOSURE

Load bearing planks are fabricated by placing an annular billet of extrusible material into an annular extrusion die cavity, moving a plurality of circumferentially spaced punches into the die cavity to form a cylindrical extrusion, and unrolling the extrusion to form a flat load bearing plank.

---

This invention relates generally to the art of working extrusible materials, such as metals, and has more particular reference to a novel method of and apparatus for fabricating flat shapes which are initially extruded in cylindrical form.

As will appear from the ensuing description, the method and apparatus of the invention may be employed to fabricate various shapes for a variety of uses. One presently useful application of the invention, however, involves the fabrication of cellular rectangular modules, commonly known as planks, which are adapted for side and end connection with other similar planks to form an extended modulator load bearing platform. For this reason, the invention will be disclosed in connection with the fabrication of such planks. In view of the above discussion, however, it should be understood that the disclosed application of the invention is intended to illustrate and not limit the invention.

Load bearing platforms of the character described are designed for placement over relatively soft, uneven, or otherwise adverse terrain to facilitate vehicular movement thereacross. Platforms of this type are used, for example, as aircraft landing mats to provide temporary aircraft runways over terrain which would otherwise be unsuitable for aircraft landings and takeoffs.

A wide variety of such load bearing platforms have been devised. Copending application Ser. No. 476,693, filed Aug. 10, 1965, and entitled Plank for Modular Load Bearing Surfaces Such as Aircraft Landing Mats, now abandoned, discloses an improved cellular metal plank adapted for side and end connection to other similar planks to form a modular load bearing platform whose principal, though not sole, use is as an aircraft landing mat. Briefly, the plank disclosed in the latter application comprises a rectangular cellular metal slab having generally flat and parallel side walls and intervening cells defining therebetween reinforcing ribs extending parallel to the ends of the slab. These cells open through one side edge only of the slab. Along the side and end edges of the slab are side and end connecting means, respectively, for joining the slab to other similar slabs. The entire slab, including its side walls, ribs, and edge connecting means, comprises an integral unitary structure formed from a single piece or billet of metal. The plank is completed by a wall member which is secured to the open side edge of the plank slab so as to close the adjacent open ends of the cells.

The plank referred to above is superior in many respects to prior similar load bearing planks, such as that disclosed in copending application Ser. No. 296,555, filed July 22, 1963, entitled Aircraft Landing Mat, now U.S. Patent No. 3,301,147. This superiority resides, primarily, in the increased strength and substantially longer life of the plank when the latter is loaded in its intended manner, and particularly when the plank is used in an aircraft landing mat. The superiority of the plank also resides in its complete lack of welded joints or other joints which tend to weaken the plank and/or produce discontinuities in the upper, load bearing surface of a load bearing platform, such as an aircraft landing mat, constructed of a number of the planks.

According to the present invention, cellular planks of the kind disclosed in the aforementioned copending application Ser. No. 476,693 are fabricated by an initial impact extrusion process involving the formation of an annular billet of extrusible material which is placed in an annular impact extrusion die cavity open at one end. A number of spaced, parallel extrusion members, or punches, arranged in a circular row, are then driven axially through the open end of the cavity and part way through the annular billet therein. The billet material displaced by the advancing punches is extruded through the spaces between adjacent punches and between the punches and the cylindrical side walls of the extrusion die cavity and finally emerges through the open end of the cavity. The product of this extrusion process is an axially split, cylindrical extrusion having integral connecting means along its confronting axial edges and one annular end edge and a number of blind cells extending axially into its remaining annular end edge. These cells extend part way only through the extrusion and define therebetween reinforcing ribs between and integrally joined to the cylindrical inner and outer extrusion walls. At the conclusion of the extrusion cycle, the cellular cylindrical extrusion is unrolled to a flat slab-like shape, the open edge of the slab is closed by a separate wall member, and integral connecting means are provided along the latter edge, thereby to provide a completed load bearing plank of the kind discussed earlier. As noted, this same method and apparatus may be employed to fabricate other flat shapes for other purposes.

Accordingly, it is a general object of the invention to provide a novel method of and apparatus for fabricating flat shapes, particularly flat cellular shapes, of extrusible material by initial impact extrusion of the material into a cylindrical configuration.

Another object of the invention is to provide a novel method of and apparatus for making cellular, metal load bearing planks of the character described.

Yet another object of the invention is to provide a novel impact extrusion method of and apparatus for integrally extruding the cellular slabs of load bearing planks of the character described.

A further object of the invention is to provide a method of and apparatus for making cellular, metal load bearing planks and other cellular slab-like shapes of the character described wherein the slabs are initially extruded in cylindrical form and thereafter unrolled to a flat condition.

Yet a further object of the invention is to provide an extrusion method and apparatus of the character described which require minimum floor space.

Other objects, advantages, and features of the invention will present themselves as the description proceeds.

With these and other objects in view, the invention consists in the construction, arrangement, and combination of parts of the invention, whereby the objects contemplated are attained as hereinafter set forth, pointed out in the appended claims, and illustrated in the attached drawings.

3

In these drawings:

FIG. 1a illustrates a billet of extrusible material to be fabricated into a cellular load bearing plank of the character described;

FIG. 1b illustrates the billet rolled into a circular configuration of subsequent extrusion;

FIG. 1c illustrates the cylindrical extrusion which is produced by the impact extrusion cycle of the invention;

FIG. 1d illustrates the extrusion of FIG. 1c being unrolled into a flat slab-like shape;

FIG. 1e is a perspective view of the partially completed plank, broken away to illustrate the internal cellular structure thereof;

FIG. 1f is a section taken on line 1f—1f of FIG. 1e illustrating a final step in the fabrication of the plank;

FIG. 2 is a vertical section through an extrusion press according to the invention for extruding the cylindrical extrusion of FIG. 1c;

FIG. 3 is an enlargement of the upper end of the extrusion press in FIG. 2;

FIG. 4 is a horizontal section through the press of FIG. 2, taken on line 4—4 in the latter figure; and FIG. 5 is an enlargement of the area encircled by the arrow 5—5 in FIG. 2.

FIGS. 1e and 1f illustrate the cellular plank 10 of the aforementioned copending application and which the fabricating method and apparatus of this invention are designed to produce. Plank 10 comprises a rectangular metal slab 12 which is constructed of a suitable extrusible material, such as aluminum. Extending into one longitudinal side edge 14 of the slab are a number of spaced parallel cells 16 of rectangular shape in transverse cross section. These cells extend only part way through the slab, in a common plane between and parallel to the normally upper and lower walls 18 and 20, respectively, of the slab, thereby to define reinforcing ribs 21 between the cells and integral edge walls along the end edges 22 and the remaining side edge 14 of the slab. Along the side edge 14 of the slab are complementary side connecting means 24 and 26, respectively, for releasably joining a number of the slabs in side-by-side relation. Along the end edges 22 of the slab are complementary end connecting means 28 and 30, respectively, for releasably joining a number of the slabs in end-to-end relation. As will appear shortly, the invention is not directly concerned with the side connecting means 26 and the end connecting means 28 and 30, which may be formed in various ways. The invention, however, is concerned to some extent with the remaining side connecting means 24 and its method of fabrication. This latter side connecting means comprises extending edge portions 18a, 20a of the slab side walls 18 and 20, respectively, edge portions 18a being turned, as shown, to form a lip 18b. The adjacent open ends of the cells 16 are closed by a fixed wall member 32.

According to the present method of fabricating the plank 10, a billet Be of extrusible material, such as aluminum, is initially formed to the shape illustrated in FIG. 1a. This billet has the side connecting means 26 formed therein, although as far as the invention is concerned, this connecting means may be later machined or otherwise formed. Billet Be may be fabricated in various ways, as by extruding it endwise to the illustrated shape. In the second step of the present method, the billet Be is rolled into the circular shape Bc of FIG. 1b. Conceivably, however, the billet may be initially fabricated in this circular shape. The third step of the method involves impact extrusion of the circular billet Bc of FIG. 1b to form the circular, cellular extrusion Ec of FIG. 1c. This extrusion has end and side connecting means, and concentric, radially spaced, circular side walls separated by intervening, alternate ribs and cells, as shown, which form the corresponding elements in the completed plank 10. For this reason, the connecting means, side walls, ribs, and cells of the circular extrusion Ec are designated by the same reference numerals as their corresponding elements in the

4 finished plank. In the fourth step of the present plank fabricating method, the circular extrusion Ec is unrolled, as illustrated in FIG. 1d, to a flat, plate or slab-like shape. During the final step of the method, the ends of the ribs along the open edge of the extrusion are machined away to form the slab wall edge portions 18a, 20a, the wall member 32 is installed between these edge portions, and the edge portion 18a is turned or bent to form the lip 18b, as shown in FIGS. 1d and 1e. During this final step of the method, the wall edge portions 18a, 20a may also be pressed inwardly to retain the wall member 32 in position and thereby complete the cellular plank 10. Edge portions 18a, 18b may be formed in other ways, as described later.

Reference is now made to FIGS. 2–5 which illustrate a novel extrusion press 34 according to the invention for extruding the circular billet Bc to form the circular extrusion Ec. This press is identical to the extrusion press disclosed in copending application Ser. No. 496,972, filed Oct. 18, 1965, and entitled Extrusion Press, now U.S. Patent No. 3,345,852, except for the extrusion die assembly 36 and extrusion punch assembly 38 of the press 34. Accordingly, these die and punch assemblies will be described in detail, while the remainder of the press will be described only in such detail as is necessary to a full and complete understanding of the invention.

With this preliminary discussion in mind, the extrusion press 34 will be seen to comprise a bolster plate 40 by which the press may be mounted on a supporting structure, such as a concrete foundation having a recessed well to receive the structure 42 of the press below the bolster. This structure comprises a drive means including a cluster of double-acting hydraulic power cylinders 44 circumferentially spaced about a central pull rod 46. This pull rod extends slidably through aligned bores in the bolster 40 and a spacer plate 48 which is bolted to the upper surface of the bolster. Each power cylinder 44 includes an outer cylinder part 50 which parallels the pull rod 46 and is secured to a thrust plate 52 attached to the rod. Within each cylinder part 50 is a piston part 54, the upper end of which is attached to the underside of the bolster 40. The cylinder spaces above and below the head 56 of each piston part 54 are selectively pressurized and vented through hydraulic fluid passages 58 and 60 which extend through the piston part, as shown. It is evident, therefore, that the pull rod 46 may be selectively driven in either axial direction by appropriately pressurizing and venting the power cylinders 44 through the passages 58 and 60.

The extrusion die assembly 36 comprises an extrusion die 62 which is secured, by means not shown, to the upper surface of the spacer plate 48. Extending through this die, in coaxial alignment with pull rod 46, is a circular die cavity 64. The upper end of the pull rod extends through the cavity, as shown, in radially spaced relation to the outer cylindrical wall of the cavity. Die cavity 64 is closed at its lower end by the spacer plate 48. Slidably fitted on the upper end of the pull rod 46 is a cylindrical mandrel 66 which slides within the pull rod bores in the bolster 40 and spacer plate 48. The external cylindrical surface of the mandrel 66 defines the inner wall of the die cavity 64. Accordingly, the die cavity has an annular configuration in transverse cross section and is open at its upper end, as shown.

The extrusion punch assembly 38 is mounted on the upper end of the pull rod 46, just above the pull rod mandrel 66. This punch assembly comprises a mounting ring 68 which is slidably fitted on the upper end of the pull rod. The lower face of the ring seats on the upper end of the mandrel 66. Mounting ring 68 has a diameter somewhat larger than that of the mandrel, such that the ring projects radially beyond the mandrel. Extending axially through the mounting ring, at a number of positions uniformly spaced therearound, are a number of openings which slidably receive extrusion punches 70. These punches have polygonally flanged upper ends seating in complementary polygonal recesses in the upper surface of the ring, whereby the punches are keyed against turning on their longitudinal axes. The upper end faces of the punches are flush with the upper surface of the mounting ring. Slidably fitted on the upper end of the pull rod 46, over the mounting ring 68, is a retainer ring 72. Above the retainer ring, the pull rod is formed with an interrupted thread to receive a quick release nut 74 which clamps the retainer ring 72 against the upper surface of the mounting ring 68 and the latter ring against the upper end of the pull rod mandrel 66. Retainer nuts 76 are threaded on the upper extremity of the pull rod.

Referring to FIG. 4, it will be observed that the extrusion punches 70 have rectangular shanks 78, two opposite side faces of which are located generally in radial planes of the pull rod 46. On the lower ends of the punches are slightly enlarged, rectangular extrusion flanges 80, the side edges of which parallel the side faces, respectively, of the punch shanks 78. Punches 70 will be observed to have the same length and to extend parallel to the pull rod 46.

Slidably fitted on the shanks 78 of the extrusion punches 70 is a locator and stripper ring 82. This ring has a lower, annular end 84 proportioned to fit slidably in the upper annular open end of the die cavity 64 and a radially enlarged upper annular end 86. The juncture of these ring ends is conically beveled or tapered both internally and externally of the ring, as shown. When the locator and stripper ring 82 rests on the lower extrusion flanges 80 of the extrusion punches 70, as it does at the outset of the extrusion cycle, the ring accurately locates the punches for initiation of the extrusion cycle. In these located positions of the punches, the latter are uniformly spaced circumferentially of the die cavity 64 and are radially centered between the inner and outer cavity side walls. The radial dimension of the extrusion flanges 80 is less by a predetermined amount than the radial dimension of the die cavity. Accordingly, when the extrusion punches 70 extend into the die cavity, an extrusion space or opening completely surrounds the extrusion flange on each punch.

In operation of the extrusion press 34, the pull rod 46 is hydraulically elevated to its upper limiting position, wherein the upper end of the rod projects above the upper end of the die cavity 64. The extrusion punch assembly 38 is then removed from the pull rod by removing the quick release nut 74. Thereafter, the circular billet Bc is placed in the die cavity, the billet being properly dimensioned to be receivable in the cavity. The punch assembly 38 and quick release nut 74 are now replaced on the pull rod 46 to condition the press 34 for the actual extrusion cycle.

During this cycle, the pull rod 46 is hydraulically driven downwardly through the die cavity 64. As the rod descends, the locator and stripper ring 82 of the extrusion punch assembly 38 enters the open upper end of the cavity to locate the descending extrusion punches 70, as explained above. The descending punches eventually encounter the billet Bc in the die cavity. During subsequent continued descension of the punches with the pull rod, the lower flanged ends of the punches penetrate the material of the billet and displace this material upwardly in the die cavity 64 through the extrusion spaces about the punch heads. Eventually, the billet material rises through the open upper end of the cavity and elevates the locator and stripper ring 82 along the extrusion punches 70. The extrusion punches are thus driven downwardly through the die cavity to a position wherein the lower ends of the punches are located a predetermined distance above the lower spacer plate 48 which closes the lower end of the cavity. The pull rod 46 and extrusion punch assembly 38 are then returned to their upper limiting positions to complete the extrusion cycle, and the extruded part, which is the circular extrusion Ec in FIG. 1c, is removed. Attention is directed to the fact that one of the extrusion punches, i.e., punch 70a, is initially axially aligned with the confronting ends of the circular billet Bc and is configured in transverse cross section to form the end connecting means 28, 30 on the extrusion Ec. The remaining punches 70 form the cells 16 in the extrusion. After removal of the extrusion Ec from the press 40, the extrusion is unrolled to a flat shape and then machined to form the edge portions 18a, 20a and remove the excess metal, fitted with the wall member 32, and bent to form the lip 18b, as explained earlier and illustrated in FIGS. 1d, 1e and 1f, thereby to provide the completed cellular plank 10.

As noted earlier, the side connecting means 26 on the finished plank may be formed in various ways, as by machining the plank after extrusion. In the drawings, however, this connecting means is initially extruded or otherwise formed on the billet Be. In this case, the billet is fitted with a removable hard forming ring 88 and the bottom wall of the die cavity 64 is provided with formations 90, which ring and formations are shaped to preserve the desired configuration of the latter connecting means during the extrusion cycle.

It is evident that while the invention has been described in connection with the extrusion of a cellular load bearing plank wherein the cells open through only one side edge of the plank, the extrusion punches 70 of the extrusion press 34 may be driven completely through the billet Bc in the die cavity 64 by initial placement of a butt ring of extrusible material below the billet at the outset of the extrusion operation. In this case, the side connecting means 26 may be provided on the completed plank 10 in the same manner as the connecting means 24. Other shapes may also be extruded. As disclosed herein, the plank wall edge portions 18a, 20a are formed by machining away the adjacent ends of the reinforcing ribs 21. If desired, these edge portions may be extruded on the original billet Bc to eliminate the final machining operation.

While the invention has been described in what is conceived to be its most practical and preferred embodiment, various modifications of the invention are possible within the spirit and scope of the following claims.

What is claimed is:

1. The method of fabricating a rectangular load bearing plank having generally flat and parallel side walls and intervening alternate reinforcing ribs and cells extending parallel to the end edges of the plank, which comprises the steps of:

placing an annular billet of extrusible material within an annular extrusion die cavity open at one end and closed at the other end by an end wall, effecting relative axial movement between said die and a plurality of extrusion punches extending parallel to the axis of and circumferentially spaced about said open end of said die cavity in a direction such as to cause said punches to axially penetrate said billet, thereby to extrude the material of said billet about said punches and toward said open end of said cavity to form a cylindrical extrusion having cylindrical inner and outer walls and intervening, radially disposed, axially extending reinforcing ribs defining cells therebetween which open through one annular end edge of the extrusion, and unrolling said extrusion to form the planar load bearing plank.

2. The method according to claim 1 wherein:

relative axial movement of said extrusion punches and said extrusion die in said direction is terminated upon penetration of said punches into said billet to positions wherein the leading ends of said punches are spaced a predetermined distance from said cavity end wall, thereby to form a cylindrical extrusion in which said cells open through said one end edge only of the extrusion.

3. The method according to claim 1 including the further steps of:

machining away the end portions of said ribs adjacent the open ends of said cells to form extending edge portions on said plank side walls along the open side edge of the plank, and bending the outer longitudinal extremity of one of said side wall edge portions toward the other wall edge portion to form a lip.

4. An extrusion press comprising:

an extrusion die having a circular cavity open at one end and closed at its other end by an end wall, a pull rod coaxially disposed relative to said cavity and having one end extending slidably through said cavity end wall into said cavity, said pull rod having an external cylindrical surface radially presented toward and spaced from the outer cylindrical wall of said cavity, thereby to define between said outer cavity wall and said external cylindrical pull rod surface an annular die cavity, an extrusion punch assembly mounted on said one end of said pull rod including a number of parallel extrusion punches circumferentially spaced about and extending axially of said annular die cavity toward the closed end thereof, each said punch being radially centered between said outer cylindrical cavity wall and external cylindrical pull rod surface and the radial dimension of each punch being less by a predetermined amount than the radial dimension of said annular die cavity, and drive means operatively connected between said extrusion die and said pull rod for effecting relative axial movement of said die and pull rod in such manner as to cause said extrusion punches to enter and emerge from said annular die cavity through the open end thereof.

5. An extrusion press according to claim 4 wherein:
said die is stationary and said pull rod and extrusion punches move axially relative to said die.

6. An extrusion press according to claim 4 wherein:
said drive means comprise hydraulic power cylinder means acting between said die and the other end of said pull rod, whereby said drive means exert a tensile force on said pull rod when driving said pull rod in a direction to advance said punches into said die cavity toward the closed end thereof.

7. The method according to claim 1, further characterized in that a connecting means is initially formed along a bottom edge of the billet to be extruded, and a forming bar is inserted intermediate the said bottom edge of the billet and the closed end of the die cavity during the extrusion to prevent distortion of the connecting means.

References Cited
UNITED STATES PATENTS

| | | | |
|---|---|---|---|
| 2,161,419 | 6/1939 | Kipperman et al. | 72—267 |
| 2,716,805 | 9/1955 | Reed | 72—256 |
| 3,064,347 | 11/1962 | Hilton | 72—266 |
| 3,167,204 | 1/1965 | Rouse | 220—5 |

CHARLES W. LANHAM, *Primary Examiner.*

L. A. LARSON, *Assistant Examiner.*